United States Patent
Gerard

(10) Patent No.: US 10,318,883 B2
(45) Date of Patent: Jun. 11, 2019

(54) IDENTIFYING OPTIMUM TIMES AT WHICH TO RETRAIN A LOGISTIC REGRESSION MODEL

(71) Applicant: International Business Machines Corporation, Armonk, NY (US)

(72) Inventor: Scott N. Gerard, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 909 days.

(21) Appl. No.: 14/669,061

(22) Filed: Mar. 26, 2015

(65) Prior Publication Data

US 2016/0283861 A1 Sep. 29, 2016

(51) Int. Cl.
*G06N 20/00* (2019.01)
*G06N 5/04* (2006.01)

(52) U.S. Cl.
CPC .............. *G06N 20/00* (2019.01); *G06N 5/04* (2013.01)

(58) Field of Classification Search
CPC ........ G06N 99/00; G06N 99/005; G06N 5/02; G06N 20/00; G06F 15/18; G06F 17/30; G06F 7/00
See application file for complete search history.

(56) References Cited

U.S. PATENT DOCUMENTS

| | | | |
|---|---|---|---|
| 2005/0228783 A1* | 10/2005 | Shanahan | G06K 9/6269 |
| 2007/0239638 A1* | 10/2007 | Zhuang | G06F 17/30707 706/20 |
| 2008/0222516 A1 | 9/2008 | Petri | |
| 2014/0164407 A1 | 6/2014 | Dubbels | |

OTHER PUBLICATIONS

Bellare et al., "WOO: A Scalable and Multi-Tenant Platform for Continuous Knowledge Base Synthesis," Proceedings of the VLDB Endowment, vol. 6, No. 11, The 39th International Conference on Very Large Data Bases, Aug. 26-30, 2013, Riva del Garda, Trento, Italy, 12 pages.
"How to Ingest Data into Google BigQuery using Talend for Big Data," A Technical Solution Paper from Saama Technologies, Inc., Jul. 30, 2013, 19 pages.

\* cited by examiner

*Primary Examiner* — Vincent Gonzales
(74) *Attorney, Agent, or Firm* — VanLeeuwen & VanLeeuwen; Diana R. Gerhardt

(57) ABSTRACT

An approach is provided in which a knowledge manager trains a machine-learning model and generates a hyperplane based upon a first set of labeled feature vectors. The knowledge manager computes, relative to the hyperplane, a first distribution of a first set of feature vectors corresponding to a first set of source documents. Subsequently, the knowledge manager computes, relative to the hyperplane, a second distribution of a second set of feature vectors corresponding to a second group of source documents. The knowledge manager, in turn, generates an indicator to retrain the machine-learning model in response to determining that a distribution difference between the second distribution and the first distribution reaches a distribution difference threshold.

17 Claims, 10 Drawing Sheets

IDENTIFYING OPTIMUM TIMES AT WHICH TO RETRAIN A LOGISTIC REGRESSION MODEL

BACKGROUND

A question answer system answers questions posed in a natural language format by applying advanced natural language processing, information retrieval, knowledge representation, automated reasoning, and machine-learning technologies. Question answer systems differ from typical document search technologies because document search technologies return a list of documents ranked in order of relevance to a word query, whereas question answer systems receive a question expressed in a natural language, seeks to understand the question in much greater detail, and returns a precise answer to the question.

System developers may train question answer systems to specific domains to provide more relevant answers to domain-specific questions (e.g., financial domain, legal domain, etc.). Training a question answer system for a new domain, however, is time consuming. During the training process, a question answer system may ingest source documents and create feature vectors that map a document's multiple features. In turn, domain experts may label a portion of the feature vectors to train the question answer system's logistic regression models by generating a "hyperplane" that separates "yes" answers from "no" answers.

Many source documents, however, may include time-dated information due to changing world conditions. For example, publishers typically publish textbooks every few years and publish journals on a monthly or quarterly basis. As such, question answer systems may require retraining at particular points in time.

BRIEF SUMMARY

According to one embodiment of the present disclosure, an approach is provided in which a knowledge manager trains a machine-learning model and generates a hyperplane based upon a first set of labeled feature vectors. The knowledge manager computes, relative to the hyperplane, a first distribution of a first set of feature vectors corresponding to a first set of source documents. Subsequently, the knowledge manager computes, relative to the hyperplane, a second distribution of a second set of feature vectors corresponding to a second group of source documents. The knowledge manager, in turn, generates an indicator to retrain the machine-learning model in response to determining that a distribution difference between the second distribution and the first distribution reaches a distribution difference threshold.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
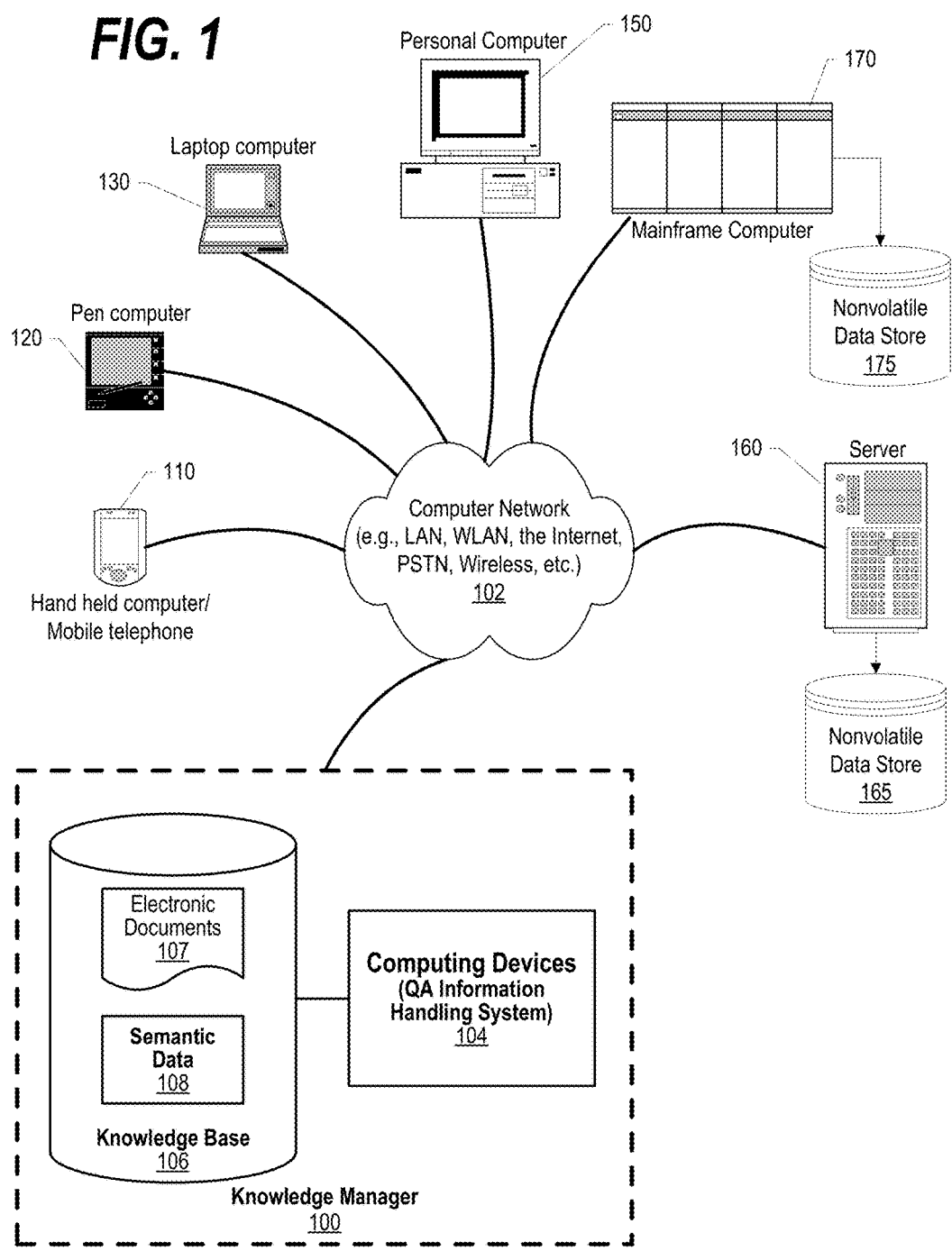
FIG. 1 depicts a schematic diagram of one illustrative embodiment of a knowledge manager system in a computer network.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, possible answer-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing possible answer information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer creation (QA) system 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 106 or other data, a content creator 108, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 100. The document 106 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize knowledge manager 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
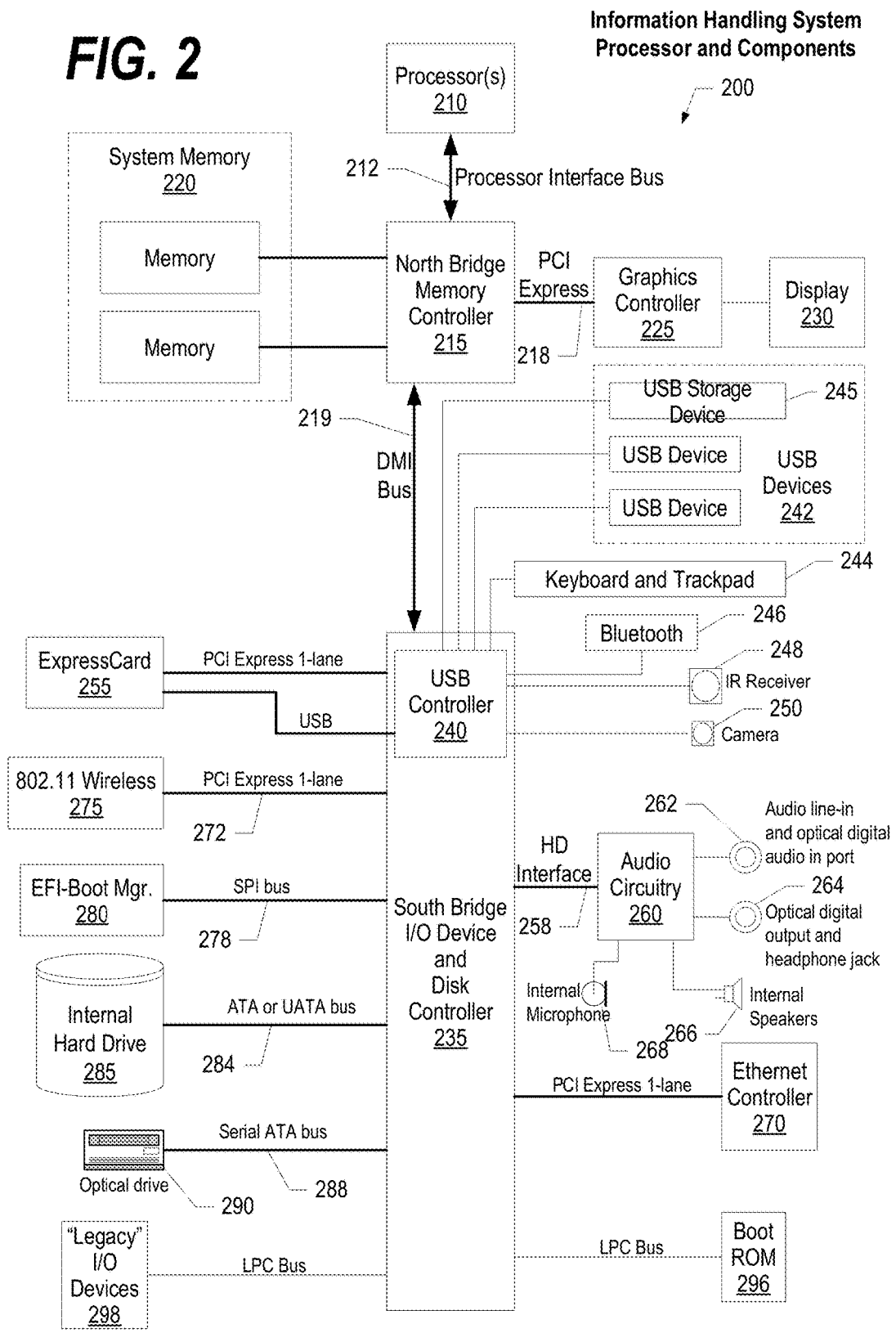
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE .802.11 standards of over-the-air modulation techniques that all use the same protocol to wireless communicate between information handling system 200 and another computer system or device. Optical storage device 290 connects to Southbridge 235 using Serial ATA (SATA) bus 288. EFI-Boot Manager 280 connects to Southbridge 235 using SPI bus 278. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-8 depict an approach that can be executed on an information handling system. A knowledge manager trains a machine-learning model using labeled baseline feature vectors that correspond to a sampling of a baseline set of source documents. During the training process, the knowledge manager generates a hyperplane and computes a baseline distribution of baseline feature vectors relative to the hyperplane (shown in FIG. 5). Over time, the knowledge manager incrementally ingests subsequent source documents and computes subsequent distributions based upon feature vectors corresponding to the subsequent source documents. The knowledge manager, in turn, retrains the machine-learning model when the difference between the baseline distribution and the subsequent distribution reaches a threshold.

Figure 3:
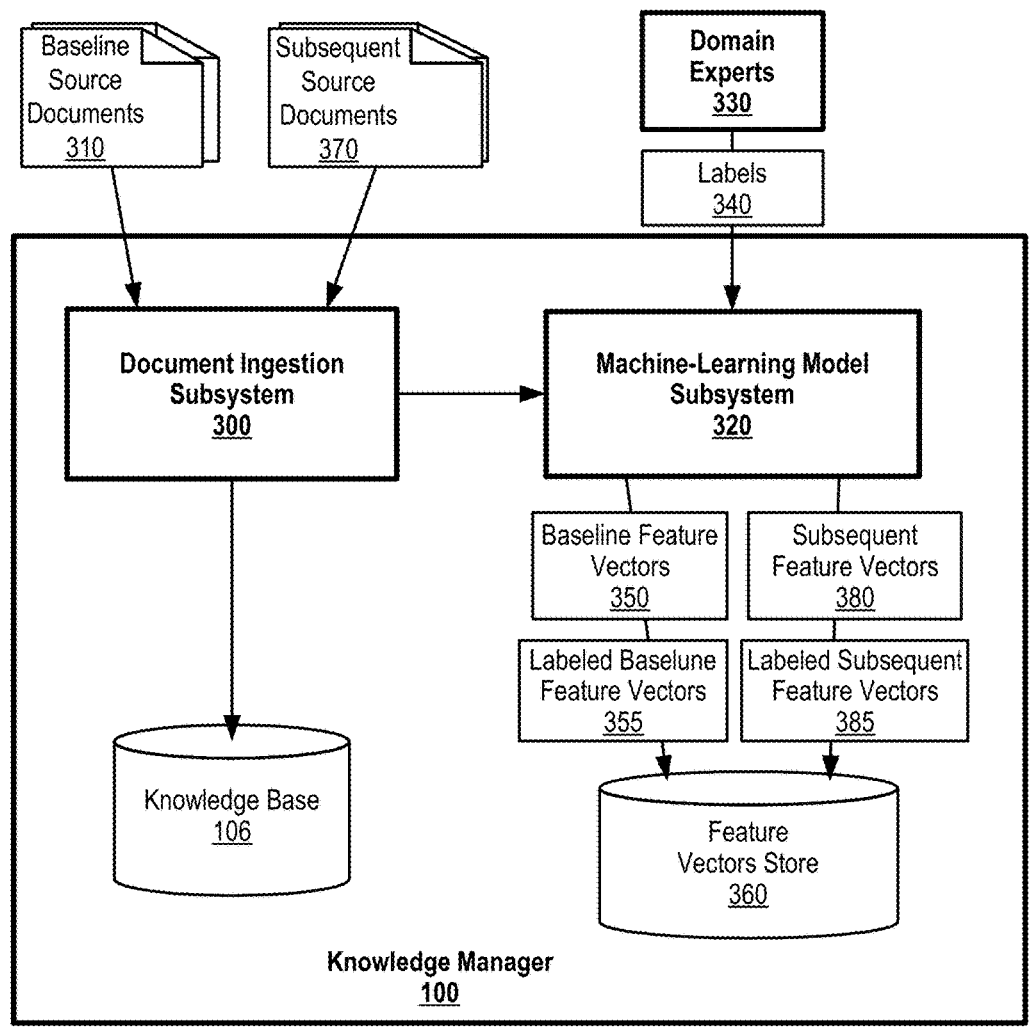
FIG. 3 is an exemplary diagram depicting a knowledge manager that trains a machine-learning model and determines an optimum time at which to retrain the machine-learning model based upon feature vectors corresponding to ingesting subsequent source documents.

FIG. 3 is an exemplary diagram depicting a knowledge manager that trains a machine-learning model utilizing feature vectors corresponding to a baseline set of source documents and determines an optimum time at which to retrain the machine-learning model based upon feature vectors corresponding to incrementally ingested subsequent source documents.

Document ingestion subsystem 300 ingests baseline source documents 310 into knowledge base 106. Steps of the ingestion process include generating feature vectors for the ingested source documents. In one embodiment, document ingestion subsystem 300 generates a feature vector for each source document. In another embodiment, document ingestion subsystem 300 generates multiple feature vectors per source document, such as a feature vector for each paragraph or sentence. A feature vector is a collection of features, each feature represented by a value computed from an input source document. For example, one feature may be a count of the number of times the word "computer" appears in the input source document. As those skilled in the art can appreciate, each document may produce a wide range of possible features.

Document ingestion subsystem 300 passes the baseline feature vectors (350) to machine-learning model subsystem 320. Machine-learning model 320 receives labels 340 from domain experts 330 for a portion of the baseline feature vectors, indicating a "yes" or "no". For example, document ingestion subsystem 300 may generate 100,000 baseline feature vectors and domain experts 330 provide labels 340 for 5,000 of the 100,000 baseline feature vectors. In turn, machine-learning model subsystem 320 stores labeled baseline feature vectors 355 and baseline feature vectors 350 in feature vectors store 360. As discussed herein, baseline feature vectors 350 may include non-labeled baseline feature vectors and labeled baseline feature vectors 355.

Figure 4:
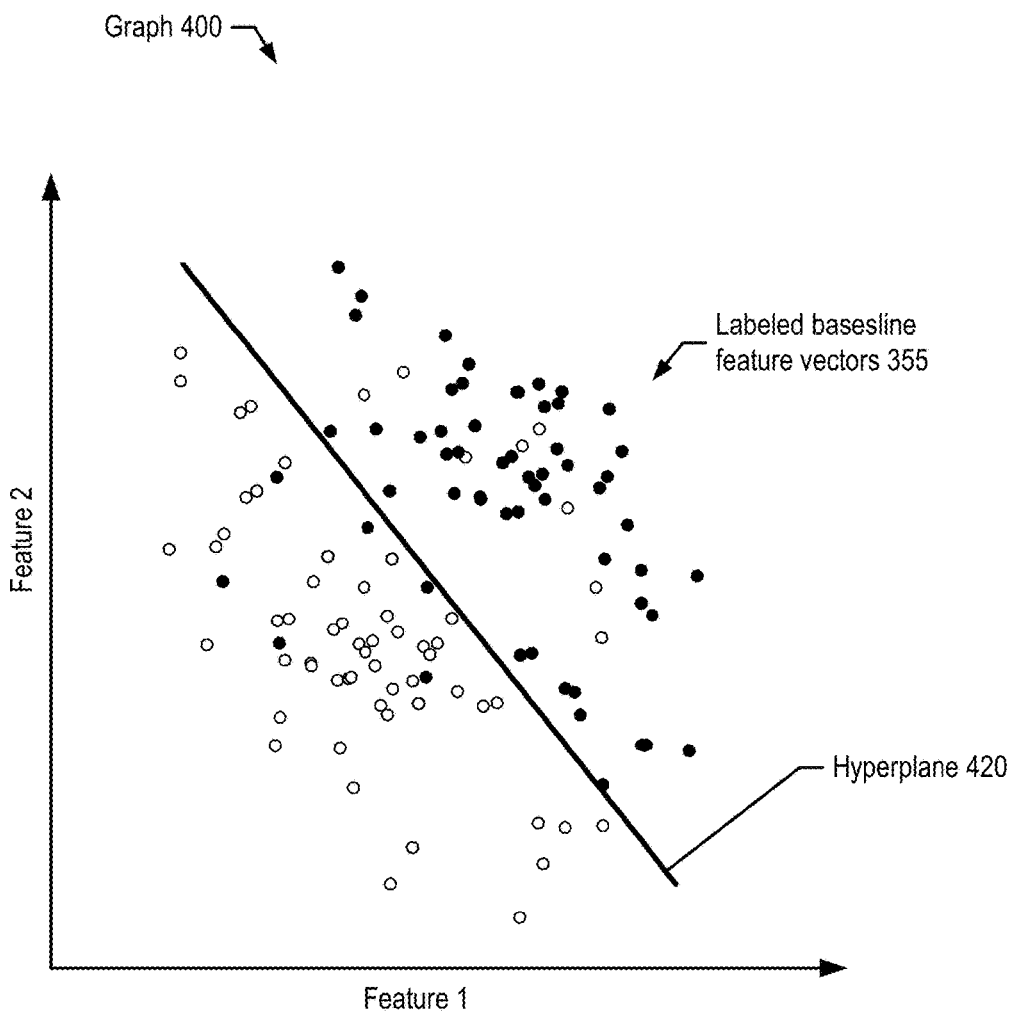
FIG. 4 is an exemplary diagram depicting a graph that plots labeled baseline feature vectors.

Machine-learning model subsystem 320 trains a machine-learning model (e.g., logistics regression model) using labeled baseline feature vectors 350 and, in turn, computes a baseline hyperplane to separate the "yes" feature vectors from the "no" feature vectors (see FIG. 4 and corresponding text for further details). Machine-learning model subsystem 320, in turn, computes a baseline distribution of the feature vectors using, in one embodiment, baseline feature vectors 350 and labeled feature vectors 355 to generate a baseline distribution such as baseline distribution 510 shown in FIG. 5.

Over time, document ingestion subsystem 300 ingests subsequent source documents 370. For example, document ingestion subsystem 300 may incrementally ingest 100 new documents per month. For each subsequent document, document ingestion subsystem 300 generates subsequent feature vectors 380 to machine-learning model subsystem 320, which are stored in feature vectors store 360. Machine-learning model subsystem 320 occasionally computes a subsequent distribution, which includes using subsequent feature vectors 380 in addition to baseline feature vectors 350 and labeled feature vectors 355 to determine if the subsequent distribution differs from the baseline distribution (see FIG. 7 and corresponding text for further details).

When machine-learning model subsystem 320 determines that the distribution difference between the baseline distribution and the updated distribution reaches a distribution difference threshold, machine-learning model subsystem 320 generates an indicator to retrain the machine-learning model due to the shift in the feature vector distribution.

Figure 8:
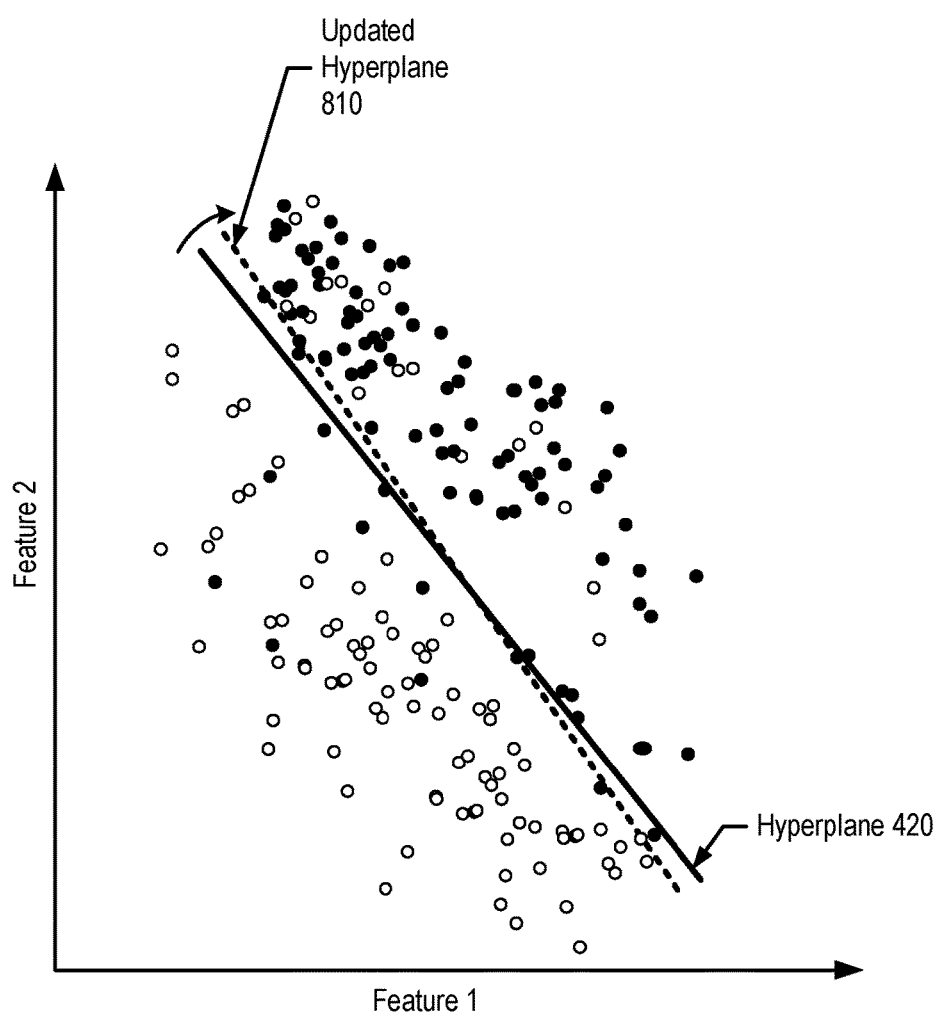
FIG. 8 is an exemplary diagram depicting an updated hyperplane in response to a shift in a feature vector distribution.

When the machine-learning model requires retraining, domain experts 330 provide labels 340 (e.g., "yes" or "no") for a portion of subsequent feature vectors 380, resulting in labeled subsequent feature vectors 385. As such, machine-learning model subsystem 320 retrains the machine-learning model using labeled baseline feature vectors 355 and labeled subsequent feature vectors 385, which results in an updated hyperplane as shown in FIG. 8. In turn, the machine-learning model generates scores for candidate answers based upon the updated hyperplane.

FIG. 4 is an exemplary diagram depicting a graph that plots labeled baseline feature vectors. As discussed herein, labeled baseline feature vectors are feature vectors corresponding to a baseline set of source documents that domain experts label (e.g., "yes" or "no"). In one embodiment, the labeled baseline feature vectors are a sampling of the overall baseline feature vectors. For example, domain experts may label 5,000 out of 100,000 baseline feature vectors that correspond to 100,000 source documents.

Graph 400 includes labeled baseline feature vectors 355, which include "yes" points (shaded dots) and "no" points (unshaded dots) relative to feature 1 and feature 2. As those skilled in the art can appreciate, the feature vectors discussed herein may represent many more than two feature sets as shown in FIGS. 4 through 8.

The knowledge manager analyzes the labeled feature vectors and computes hyperplane 420, which is a proximate "line" between yes answers and no answers. As such, the machine-learning model uses hyperplane 420 to compute scores for candidate answers to a question.

Figure 5:
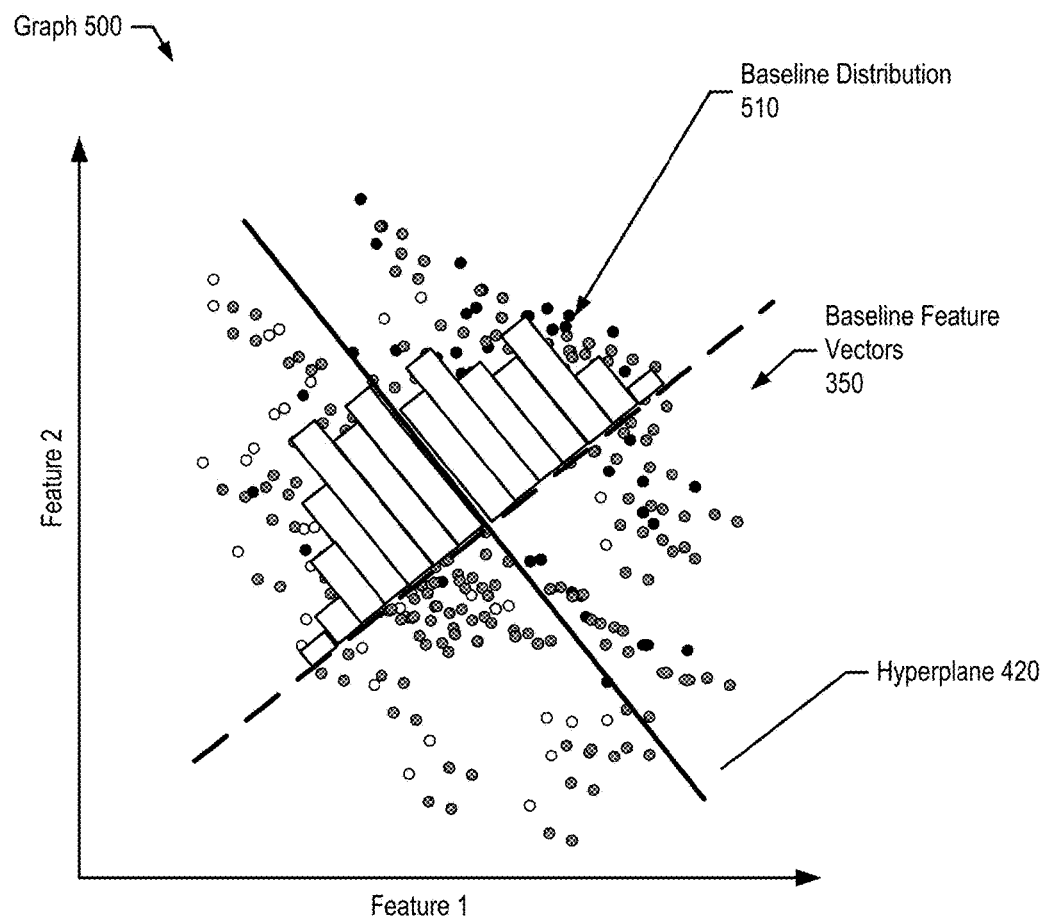
FIG. 5 is an exemplary diagram depicting a distribution of baseline feature vectors relative to a baseline hyperplane.

FIG. 5 is an exemplary diagram depicting a distribution of baseline feature vectors relative to a baseline hyperplane. Graph 500 shows that when the knowledge manager generates hyperplane 420 (from FIG. 4), the knowledge manager computes a baseline distribution utilizing the overall baseline feature vectors 350 (e.g., 100,000 points) relative to hyperplane 420, which may include the labeled baseline feature vectors as discussed previously. In turn, the knowledge manager generates baseline distribution 510, which the knowledge manager compares against subsequent distributions over time to determine an optimum time at which to retrain the machine-learning model (see FIGS. 6-8 and corresponding text for further details).

Figure 6:
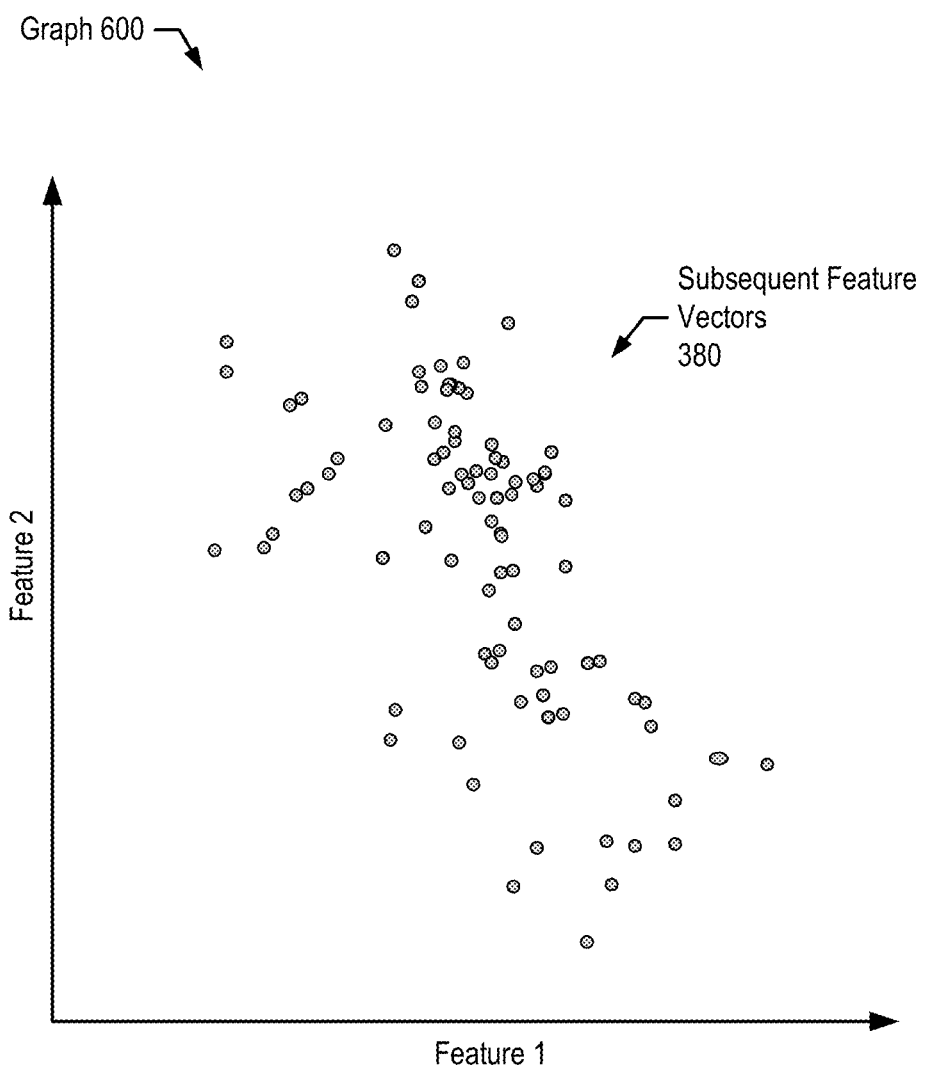
FIG. 6 is an exemplary diagram depicting a distribution of subsequent feature vectors.

FIG. 6 is an exemplary diagram depicting a distribution of subsequent feature vectors. As the knowledge manager incrementally ingests source documents subsequent to the initial baseline document ingestion, the knowledge manager generates subsequent feature vectors 380. Graph 600 shows that, at times, the knowledge manager computes a subsequent distribution that takes into account subsequent feature vectors 380 and baseline feature vectors 350 to assess whether the overall distribution changes from the baseline distribution shown in FIG. 5 (see FIG. 7 and corresponding text for further details).

Figure 7:
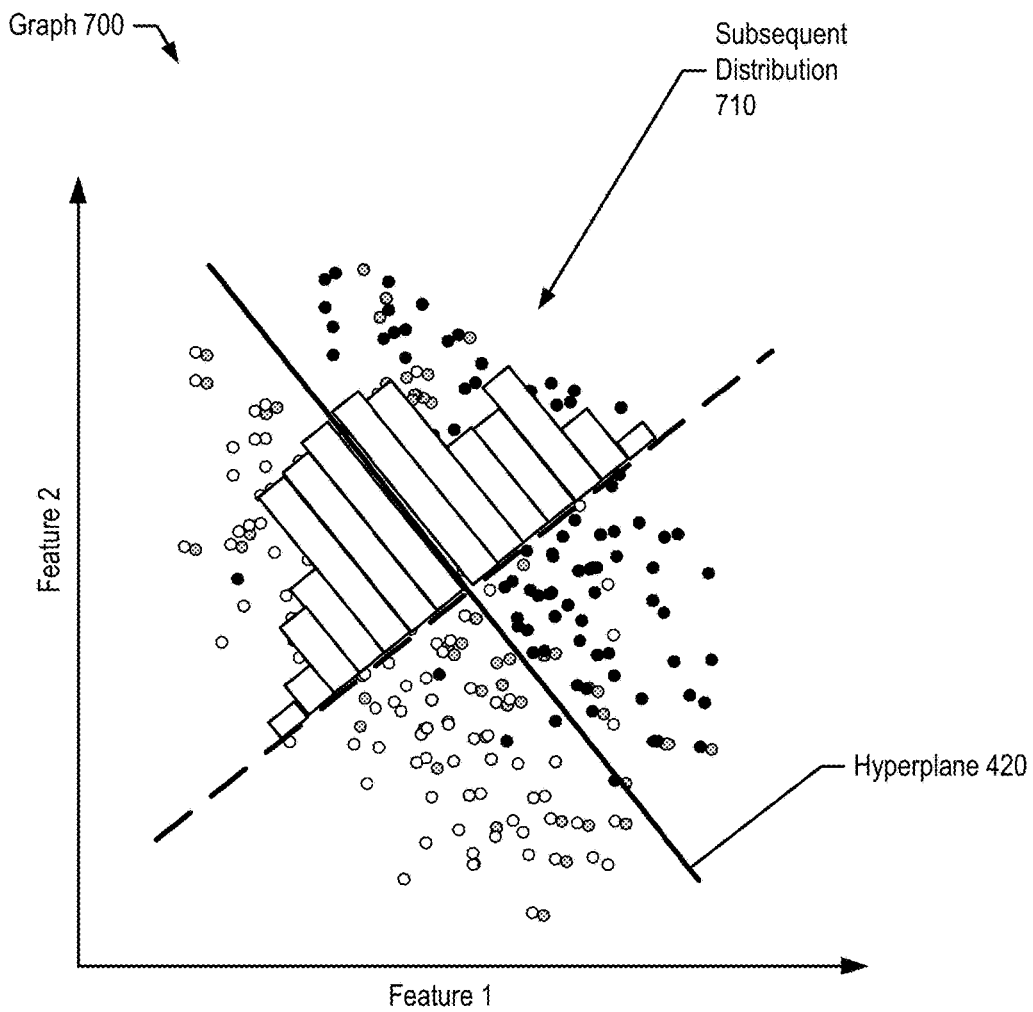
FIG. 7 is an exemplary diagram depicting a distribution of baseline feature vectors and subsequent feature vectors relative to a baseline hyperplane.

FIG. 7 is an exemplary diagram depicting a subsequent distribution of baseline feature vectors and subsequent feature vectors relative to a baseline hyperplane. Graph 700 shows a combination of feature vectors that include the baseline feature vectors and the subsequent feature vectors as discussed herein. The knowledge manager generates subsequent distribution 710, which is a distribution of the combined feature vectors relative to hyperplane 420.

In turn, the knowledge manager compares subsequent distribution 710 with baseline distribution 510 from FIG. 5 to determine whether the overall feature vector distribution shifts. If so, the knowledge manager generates an indicator to retrain the machine-learning model and regenerate a new hyperplane that separates "yes" answers from "no" answers (see FIG. 8 and corresponding text for further details).

FIG. 8 is an exemplary diagram depicting an updated hyperplane computed by the knowledge manager in response to detecting a shift in a feature vector distribution. When the knowledge manager determines a distribution difference that reaches a threshold, the knowledge manager invokes a machine-learning model retraining process. The knowledge manager obtains labeled subsequent feature vectors from domain experts, for example, and combines the labeled subsequent feature vectors with the labeled baseline feature vectors to compute updated hyperplane 810.

FIG. 8 shows that the labeled subsequent feature vectors caused hyperplane 420 to slightly shift. In one embodiment, the hyperplane shift may not effect feature vectors far from hyperplane 810, but feature vectors in close proximity to updated hyperplane 810 may switch values, such as switching from a "no" result to a "yes" result and vice versa.

Figure 9:
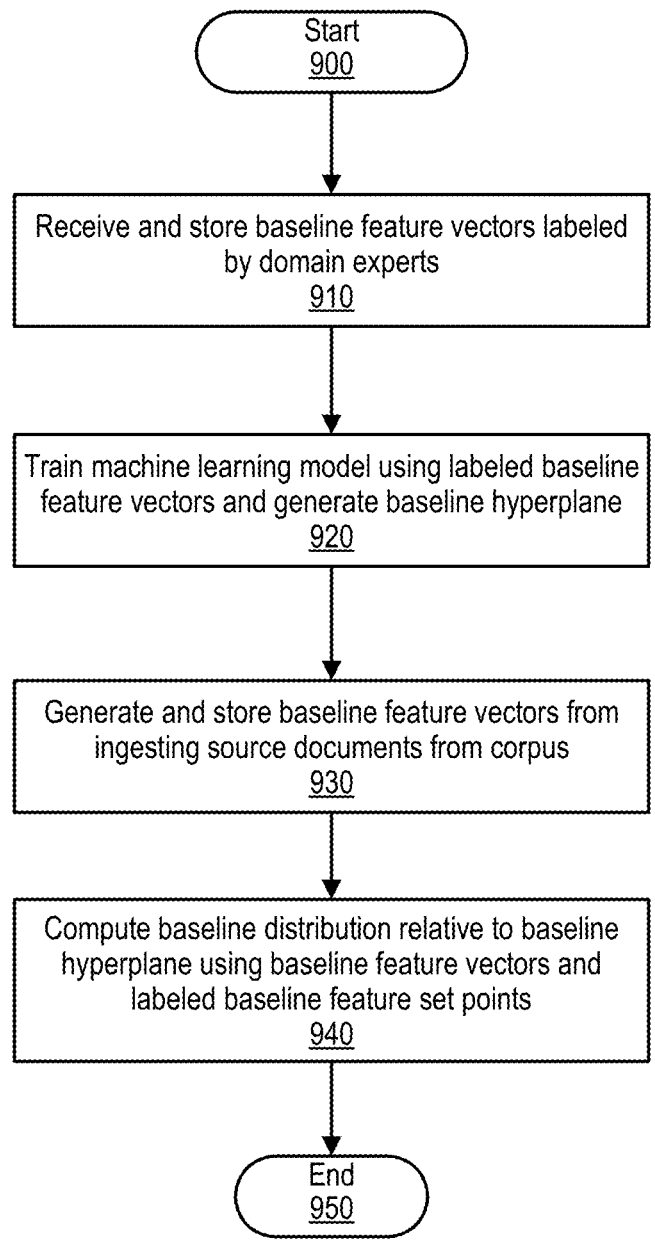
FIG. 9 is an exemplary flowchart depicting steps by a knowledge manager to train a machine-learning model using a baseline set of feature vectors.

FIG. 9 is an exemplary flowchart depicting steps by a knowledge manager to train a machine-learning model using a baseline set of feature vectors. Processing commences at 900, whereupon, at step 910, the process receives and stores baseline feature vectors labeled by domain experts. For example, a finance domain expert (or experts) may label 5,000 feature vectors "yes" or "no" corresponding to 5,000 documents included in a corpus of 100,000 documents. As those skilled in the art can appreciate, feature vectors may correspond to a finer document granularity, such as corresponding to a paragraph, sentence, or phrase.

At step 920, the process trains the machine-learning model using the labeled baseline feature vectors and generates a baseline hyperplane in the process of training. As shown in FIG. 4, the hyperplane indicates a proximate separation between "yes" answers and "no" answers that, in turn, a question answer system utilizes to score possible answers to a question.

At step 930, the process generates and stores feature vectors while ingesting the "baseline" source documents from the corpus. Continuing with the example above, the process generates 95,000 more feature vectors from the remaining 95,000 documents in the corpus that were not labeled by the domain experts. In one embodiment, the process generates the entire baseline feature vectors (100,000) and the domain experts label a portion of the overall baseline feature vectors.

At step 940, the process computes a baseline distribution of the feature vectors (labeled and unlabeled) relative to the baseline hyperplane. FIG. 9 processing thereafter ends at 950.

Figure 10:
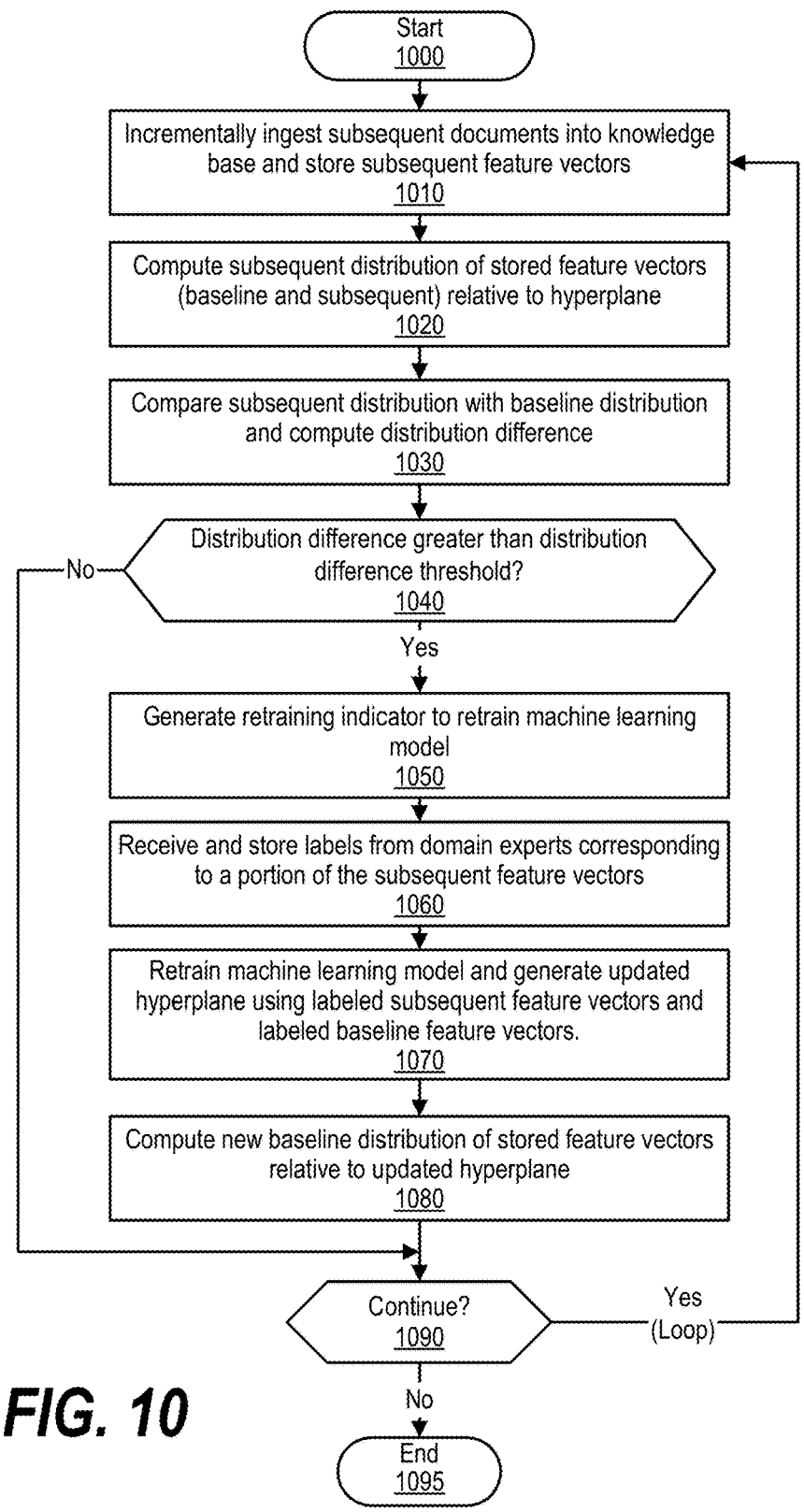
FIG. 10 is an exemplary flowchart depicting steps by a knowledge manager to determine an optimum point at which to retrain a machine-learning model based upon subsequent source document feature vectors.

FIG. 10 is an exemplary flowchart depicting steps by a knowledge manager to determine an optimum point at which to retrain a machine-learning model based upon subsequent source document feature vectors. A knowledge manager trains a machine-learning model using a baseline set of labeled feature vectors, which correspond to a sampling of a baseline set of source documents in a corpus (shown in FIG. 9).

Over time, the knowledge manager incrementally ingests subsequent source documents that may include enough up-to-date information to require a retraining of the machine-learning model. In order to determine a time at which the machine-learning model requires retraining, the process computes and monitors the distributions of feature vectors corresponding to the subsequent source documents in combination with the baseline feature vectors (discussed below).

Processing commences at 1000, whereupon, at step 1010, the process incrementally ingests subsequent documents into the knowledge base and stores corresponding subsequent feature vectors. At step 1020, the process computes a subsequent distribution of the stored feature vectors (baseline feature vectors and subsequent feature vectors) relative to the baseline hyperplane generated in FIG. 9.

At step 1030, the process compares the subsequent distribution with the baseline distribution and computes a distribution difference. In one embodiment, the process partitions the distribution into segments (e.g., one standard deviation, two standard deviations, etc.) and computes a distribution difference with applicable weightings for each segment (e.g., heavier weightings to segment differences closer to the hyperplane). In another embodiment, the process sets a width "w" corresponding to a distance (both sides) from the hyperplane and counts the number of "near yes" points and "near no" points. In this embodiment, the process computes a near yes ratio, such as #near yes/(#near yes+#near no) and determines whether the yes ratio changes by more than "p" percent (distribution difference) between the baseline distribution and the subsequent distributions. As those skilled in the art can appreciate, the process may use other ways to compare the difference between the baseline distribution and the subsequent distribution, such as by using a Kullback-Leibler divergence technique.

The process determines as to whether the distribution difference reaches a distribution difference threshold (decision 1040). If the distribution difference is not greater than the distribution difference threshold, then decision 1040 branches to the 'no' branch and the machine-learning model continues to score candidate answers based upon the baseline hyperplane.

On the other hand, if the distribution difference is greater than the distribution difference threshold, then decision 1040 branches to the 'yes' branch. At step 1050, the process generates a retraining indicator to retrain machine-learning model. In one embodiment, the process may generate a notification to a system administrator, informing the system administrator to commence retraining the machine-learning model. In another embodiment, the process may automatically commence retraining the machine-learning model.

Similar to baseline training of the machine-learning model shown in FIG. 9, the process retrains the machine-learning model utilizing subsequent feature vectors labeled (yes or no) by domain experts. In one embodiment, the domain experts label a sampling of the subsequent feature vectors (e.g., 20% of the subsequent feature vectors). As such, at step 1060, the process receives and stores labels from domain experts corresponding to a portion of the subsequent feature vectors.

At step 1070, the process retrains the machine-learning model and generates an updated hyperplane (e.g., hyperplane 800 shown in FIG. 8) using the labeled subsequent feature vectors and the labeled baseline feature vectors. At step 1080, the process computes a new baseline distribution of the stored feature vectors relative to the updated hyperplane (i.e. new baseline hyperplane).

The process determines as to whether to continue to analyze subsequently ingested source documents (decision 1090). If the process should continue, then decision 1090 branches to the 'yes' branch to analyze subsequent source documents. On the other hand, if the process should terminate, then decision 1090 branches to the 'no' branch. FIG. 10 processing thereafter ends at 1095.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   generating, by the processor, a first hyperplane in response to training a machine-learning model utilizing a first set of labeled feature vectors corresponding to a first group of source documents, wherein the first set of labeled feature vectors comprises at least one yes labeled feature vector and at least one no labeled feature vector;
   computing, by the processor, a first distribution of a first set of feature vectors relative to the first hyperplane, wherein the first set of feature vectors correspond to the first group of source documents;
   ingesting, by the processor, a second group of source documents in response to the generation of the first hyperplane;
   computing, by the processor, a second distribution of a second set of feature vectors relative to the first hyperplane, wherein the second set of feature vectors correspond to at least the second group of source documents; and
   retraining, by the processor, the machine-learning model in response to determining that a distribution difference between the second distribution and the first distribution reaches a distribution difference threshold.

2. The method of claim 1 further comprising:
   labeling a portion of the second set of feature vectors, resulting in a second set of labeled feature vectors; and
   utilizing a combination of the first set of labeled feature vectors and the second set of labeled feature vectors to retrain the machine-learning model.

3. The method of claim 2 further comprising:
   generating a second hyperplane in response to the retraining of the machine-learning model, wherein the second hyperplane is different from the first hyperplane.

4. The method of claim 1 wherein the determination that the distribution difference reaches the distribution difference further comprises:
   computing a baseline ratio based upon a number of yes labeled baseline feature vectors and a number of no labeled baseline feature vectors within a predetermined width from the first hyperplane, wherein the yes labeled baseline feature vectors comprise the at least one yes labeled feature vector, and wherein the no labeled baseline feature vectors comprise the at least one no labeled feature vector;
   computing a subsequent ratio based upon a number of yes labeled subsequent feature vectors and a number of no labeled subsequent feature vectors within the predetermined width from the first hyperplane; and
   determining that the difference between the subsequent ratio and the baseline ratio reaches the distribution difference threshold.

5. The method of claim 1 wherein the machine-learning model is a logistic regression model utilized by a question answer system to generate candidate answers to a question.

6. The method of claim 1 wherein the second set of feature vectors includes the first set of feature vectors.

7. An information handling system comprising:
   one or more processors;
   a memory coupled to at least one of the processors; and
   a set of computer program instructions stored in the memory and executed by at least one of the processors in order to perform actions of:
   generating, by one of the one the processors, a first hyperplane in response to training a machine-learning model utilizing a first set of labeled feature vectors corresponding to a first group of source documents, wherein the first set of labeled feature vectors comprises at least one yes labeled feature vector and at least one no labeled feature vector;
   computing, by one of the one the processors, a first distribution of a first set of feature vectors relative to the first hyperplane, wherein the first set of feature vectors correspond to the first group of source documents;
   ingesting, by one of the one the processors, a second group of source documents in response to the generation of the first hyperplane;
   computing, by one of the one the processors, a second distribution of a second set of feature vectors relative to the first hyperplane, wherein the second set of feature vectors correspond to at least the second group of source documents; and
   retraining, by one of the one the processors, the machine-learning model in response to determining that a distribution difference between the second distribution and the first distribution reaches a distribution difference threshold.

8. The information handling system of claim 7 wherein the one or more processors perform additional actions comprising:
   labeling a portion of the second set of feature vectors, resulting in a second set of labeled feature vectors; and
   utilizing a combination of the first set of labeled feature vectors and the second set of labeled feature vectors to retrain the machine-learning model.

9. The information handling system of claim 8 wherein the one or more processors perform additional actions comprising:
   generating a second hyperplane in response to the retraining of the machine-learning model, wherein the second hyperplane is different from the first hyperplane.

10. The information handling system of claim 7 wherein the one or more processors perform additional actions comprising:
    computing a baseline ratio based upon a number of yes labeled baseline feature vectors and a number of no labeled baseline feature vectors within a predetermined width from the first hyperplane, wherein the yes labeled baseline feature vectors comprise the at least one yes labeled feature vector, and wherein the no labeled baseline feature vectors comprise the at least one no labeled feature vector;
    computing a subsequent ratio based upon a number of yes labeled subsequent feature vectors and a number of no labeled subsequent feature vectors within the predetermined width from the first hyperplane; and
    determining that the difference between the subsequent ratio and the baseline ratio reaches the distribution difference threshold.

11. The information handling system of claim 7 wherein the machine-learning model is a logistic regression model utilized by a question answer system to generate candidate answers to a question.

12. The information handling system of claim 7 wherein the second set of feature vectors includes the first set of feature vectors.

13. A computer program product stored in a computer readable storage medium, comprising computer program code that, when executed by an information handling system, causes the information handling system to perform actions comprising:
  generating a first hyperplane in response to training a machine-learning model utilizing a first set of labeled feature vectors corresponding to a first group of source documents, wherein the first set of labeled feature vectors comprises at least one yes labeled feature vector and at least one no labeled feature vector;
  computing a first distribution of a first set of feature vectors relative to the first hyperplane, wherein the first set of feature vectors correspond to the first group of source documents;
  ingesting a second group of source documents in response to the generation of the first hyperplane;
  computing a second distribution of a second set of feature vectors relative to the first hyperplane, wherein the second set of feature vectors correspond to at least the second group of source documents; and
  retraining the machine-learning model in response to determining that a distribution difference between the second distribution and the first distribution reaches a distribution difference threshold.

14. The computer program product of claim 13 wherein the information handling system performs additional actions comprising:
  labeling a portion of the second set of feature vectors, resulting in a second set of labeled feature vectors; and
  utilizing a combination of the first set of labeled feature vectors and the second set of labeled feature vectors to retrain the machine-learning model.

15. The computer program product of claim 14 wherein the information handling system performs additional actions comprising:
  generating a second hyperplane in response to the retraining of the machine-learning model, wherein the second hyperplane is different from the first hyperplane.

16. The computer program product of claim 13 wherein the information handling system performs additional actions comprising:
  computing a baseline ratio based upon a number of yes labeled baseline feature vectors and a number of no labeled baseline feature vectors within a predetermined width from the first hyperplane, wherein the yes labeled baseline feature vectors comprise the at least one yes labeled feature vector, and wherein the no labeled baseline feature vectors comprise the at least one no labeled feature vector;
  computing a subsequent ratio based upon a number of yes labeled subsequent feature vectors and a number of no labeled subsequent feature vectors within the predetermined width from the first hyperplane; and
  determining that the difference between the subsequent ratio and the baseline ratio reaches the distribution difference threshold.

17. The computer program product of claim 13 wherein the machine-learning model is a logistic regression model utilized by a question answer system to generate candidate answers to a question.

\* \* \* \* \*